Patented Sept. 19, 1939

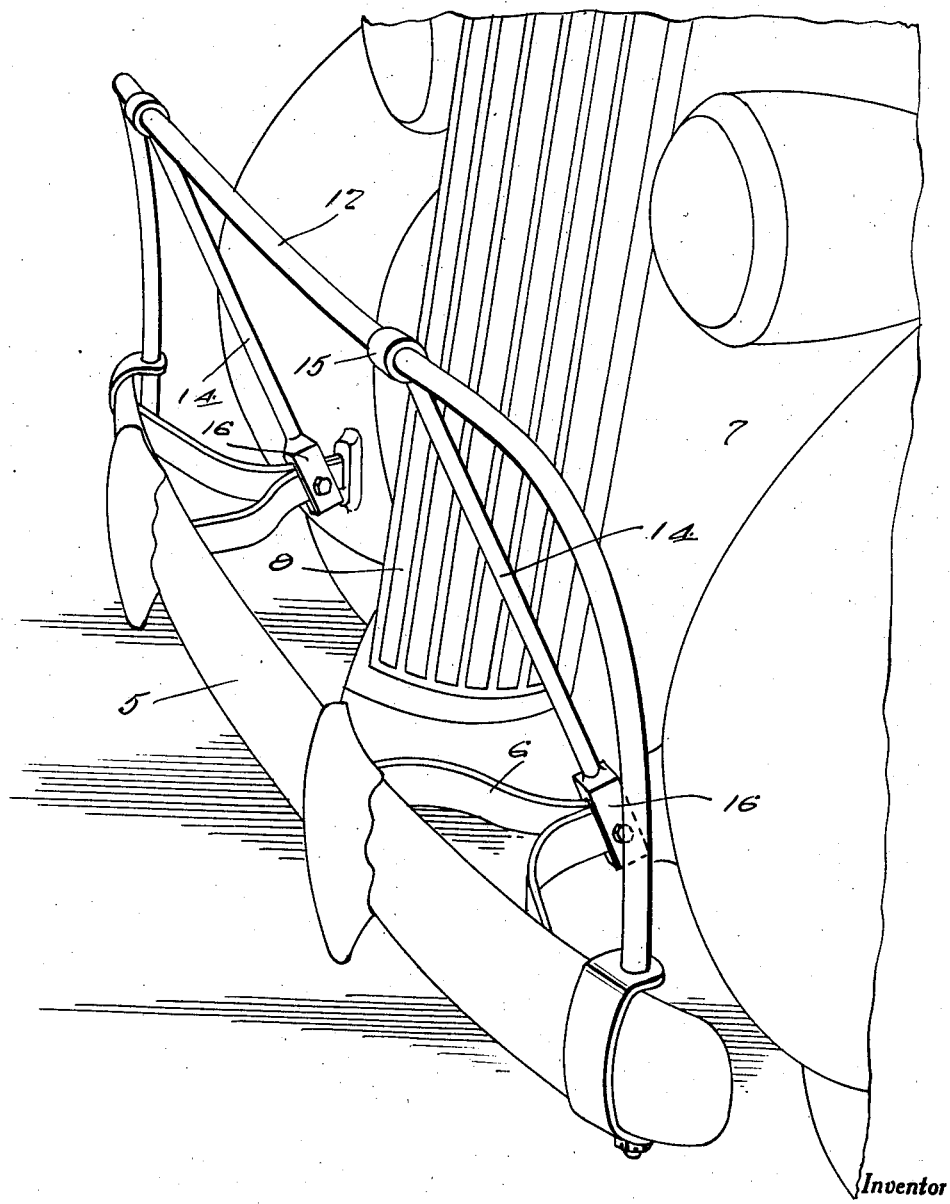

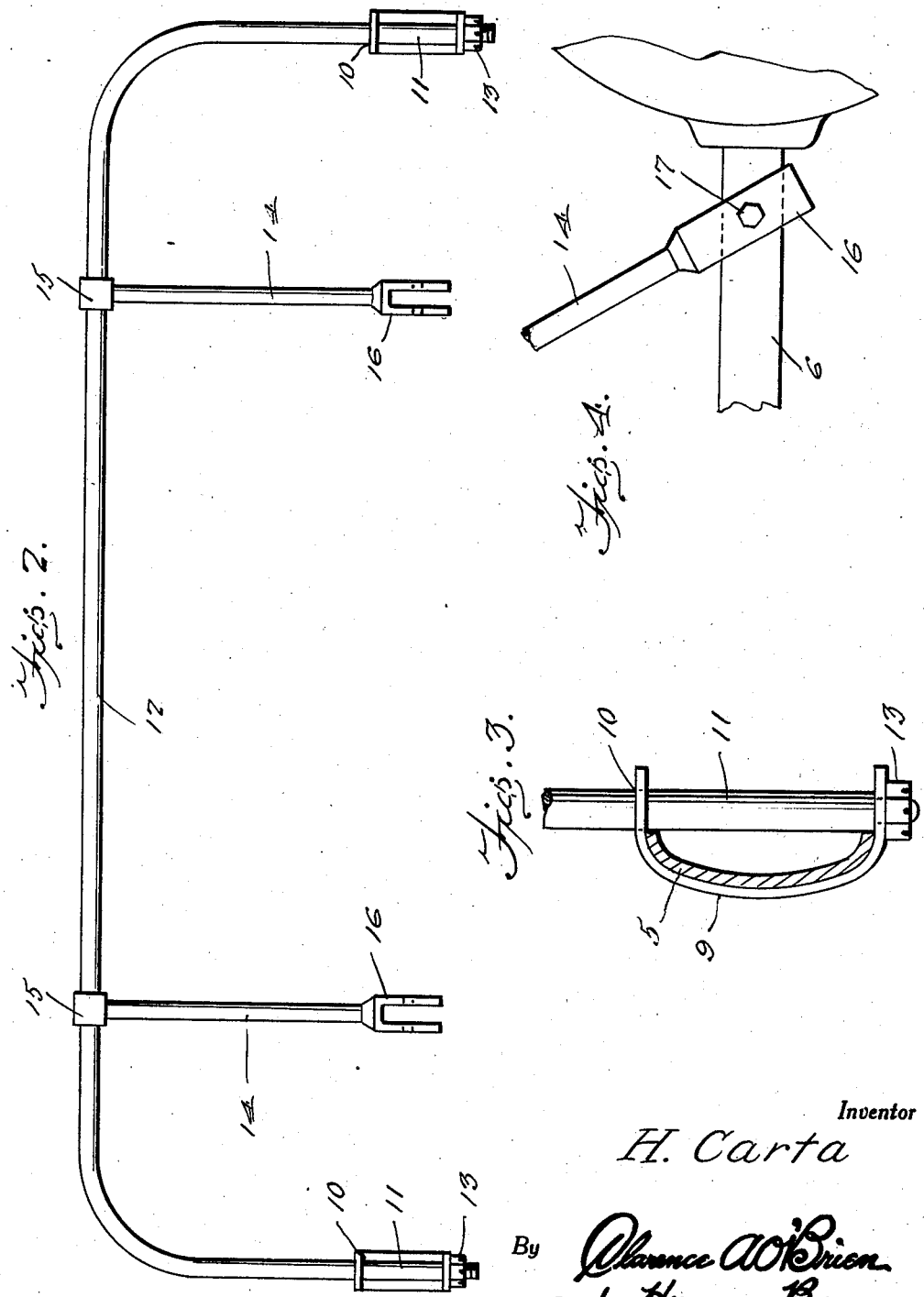

2,173,408

UNITED STATES PATENT OFFICE 2,173,408

VEHICLE BUMPER

Harry Carta, Ocala, Fla.

Application May 3, 1938, Serial No. 205,806

4 Claims. (Cl. 293—55)

The present invention relates to vehicle bumpers and has for its primary object to provide an auxiliary bumper attachment embodying means for supporting the same in a position above the regular vehicle bumper for the purpose of protecting the upper portion of the vehicle radiator grill and fenders to prevent injury thereto upon the striking of an object.

A further object is to provide an auxiliary bumper attachment adapted for securing in position to an ordinary type of vehicle bumper and which at the same time is strong and durable, neat and attractive in appearance, which can be readily mounted in position without necessitating any change or alterations in the constructions of the vehicle and otherwise well adapted for the purposes for which the same is intended.

Other objects and advantages reside in the details of construction as more fully hereinafter described and claimed, reference being had to the accompanying drawings forming part hereof, wherein like numerals refer to like parts throughout, and in which Figure 1 is a fragmentary perspective view of the front end of an automobile showing the device mounted in position thereon.

Figure 2 is a rear elevational view of the auxiliary bumper removed from the vehicle.

Figure 3 is a transverse sectional view through the regular vehicle bar bumper showing one end of the auxiliary bumper clamped thereto, and Figure 4 is a fragmentary detail of the connection for one of the brace rods.

Referring now to the drawings in detail, the numeral 5 designates a conventional type of automobile bar bumper secured adjacent its ends by forwardly diverging spring bars 6 connected at their rear ends to the vehicle 7 at either side of the radiator grill 8. The bumper 5 in the present instance is shown formed of sheet metal with its upper and lower edges curved rearwardly as shown to advantage in Figure 3 and to which, adjacent each end thereof is secured a U-shaped clamping bracket 9 having its bight portion conformably fitted over the front surface of the bumper bar 5 and its end portion horizontally arranged in superposed relation and provided with openings 10 for receiving the end portion 11 of an invertedly arranged U-shaped auxiliary bumper bar 12, said auxiliary bumper bar 12 preferably being of rod form with its bight portion supported in parallel relation above the main bumper bar 5 and forwardly of the radiator grill as clearly shown in Figure 1 of the drawings. The end portions 11 of the auxiliary bumper bar 12 are provided with nuts 13 to secure the same against upward movement in the bracket 9 and a pair of brace rods 14 are provided with eyes 15 at one end through which the bight portion of the auxiliary bumper bar 12 is inserted, the brace rods extending downwardly and rearwardly and provided at their lower ends with a bifurcated head 16 adapted to straddle the inner ends of the spring bars 6 and secured thereto by bolts 17 which are inserted through aligned openings in said head and said spring bars.

From the foregoing it will be apparent that the auxiliary bumper bar 12 is rigidly supported in an upright position above the main bumper bar 5 and will adequately serve to protect the central portion of the radiator grill as well as the front fenders of the vehicle from injury.

It is believed the details of construction and manner of supporting the device in position above the vehicle will be readily understood from the foregoing without further detailed explanation.

Having thus described the invention, what I claim is—

1. An auxiliary bumper attachment for the main bumper of a vehicle comprising an invertedly arranged U-shaped auxiliary bumper bar, having its ends positioned crosswise of the main bumper, clamping means for securing the end portions of the auxiliary bumper to the main bumper bar and brace rods for the intermediate portion of said auxiliary bumper bar, said clamping means including nuts threaded on the ends of the auxiliary bumper bar adapted to effect a downward pressure on the brace rod and a forward pressure of the auxiliary bumper bar against the main bumper bar.

2. In combination a main bumper having supporting spring bars and an auxiliary bumper arranged above the main bumper and comprising an inverted U-shaped bumper bar having its ends positioned crosswise of the main bumper, means connecting the ends thereof to the main bumper, brace rods connected at their upper ends to the bight portion of the auxiliary bumper and bifurcated heads on the lower ends of said brace rods and attached to said spring arms, said connecting means including a slack take-up device adapted to tighten all of the connections between the several parts.

3. In combination a main bumper having supporting spring bars and an auxiliary bumper arranged above the main bumper and comprising an inverted U-shaped bumper bar having its ends positioned crosswise of the main bumper, U-shaped clamps connecting the ends of the auxiliary bumper to the end portions of the main bumper, brace rods for the auxiliary bumper having eyes at their upper ends for receiving the auxiliary bumper and bifurcated heads at the lower ends of said brace rods adapted to straddle said spring bars, said clamps including the slack take-up device adapted to tighten all of the connections between the several parts.

4. In a vehicle bumper construction the combination of a main horizontal bumper bar having a rearwardly extending supporting bracket, of an auxiliary bumper comprising an inverted U-shaped bar, U-shaped clamping members having apertured end portions projecting rearwardly of thee main bumper bar and slidably receiving the ends of the U-shaped bar, a pair of upstanding brace rods having their lower ends secured to the respective supporting brackets for adjustable swinging movement of the upper ends of the rods into a desired position for pivotally attaching to the upper bight portion of the U-shaped bar and nuts threaded on the lower ends of the U-shaped bar and bearing against the clamping members for tightening the connections between the several parts.

HARRY CARTA.